| United States Patent [19] | [11] | 4,049,582 |
|---|---|---|
| Erickson et al. | [45] | Sept. 20, 1977 |

[54] METHOD FOR PRODUCING A SUPPORTED CATALYST

[75] Inventors: Henry Erickson, Park Forest; John Mooi, Hazelcrest, both of Ill.

[73] Assignee: Atlantic Richfield Company, Philadelphia, Pa.

[21] Appl. No.: 670,494

[22] Filed: Mar. 25, 1976

Related U.S. Application Data

[60] Division of Ser. No. 562,107, March 26, 1975, Pat. No. 3,974,255, which is a continuation of Ser. No. 340,348, March 12, 1973, abandoned.

[51] Int. Cl.$^2$ .................... B01J 21/04; B01J 23/42; B01J 23/44
[52] U.S. Cl. .................... 252/466 PT; 252/463; 252/464; 252/465; 252/466 J
[58] Field of Search ................ 252/466 PT, 463, 464, 252/465, 466 J

[56] References Cited
U.S. PATENT DOCUMENTS

| 2,071,119 | 2/1967 | Harger | 252/463 |
|---|---|---|---|
| 3,791,992 | 2/1974 | Feldwick | 252/463 |

*Primary Examiner*—W. J. Shine
*Attorney, Agent, or Firm*—John B. Goodman; Frank J. Uxa

[57] ABSTRACT

Improved methods for reducing the amounts of hydrocarbon, carbon monoxide and nitrogen oxides in the exhaust gases of internal combustion engines involving the use of catalysts comprising a major amount of crystalline magnesium aluminate spinel. Improved catalysts as well as improved methods for making the present catalyst are also included.

7 Claims, No Drawings

METHOD FOR PRODUCING A SUPPORTED CATALYST

This is a division of application Ser. No. 562,107 filed Mar. 26, 1975 now U.S. Pat. No. 3,974,255, which is a continuation of application Ser. No. 340,348 filed Mar. 12, 1973, now abandoned.

The present invention relates to reduction in the amount of hydrocarbon, carbon monoxide and nitrogen oxides in the exhaust gases of internal combustion engines. More particularly, the invention relates to improved methods for catalytically oxidizing at least a portion of the hydrocarbon and carbon monoxide and catalytically reducing at least a portion of the nitrogen oxides contained in internal combustion engine exhaust gases as well as an improved oxidation catalyst, an improved reduction catalyst and methods for making same.

The internal combustion engine manufactures useful power by the explosive combustion of fuel, normally of the hydrocarbon type, such as natural gas, gasoline, kerosene, diesel fuel, etc., and oxygen, normally taken from air. It is almost inherent that a certain amount of carbon monoxide, hydrocarbon and oxides of nitrogen will be present in the exhaust gases from these engines. The carbon monoxide, hydrocarbon and nitrogen oxides emitted from internal combustion engines add significantly to the overall problem of air pollution. Therefore, it would be advantageous to minimize the amounts of these harmful pollutants emitted in the exhausts of internal combustion engines.

One method for reducing the amount of carbon monoxide, hydrocarbon, and nitrogen oxides from internal combustion engines is to catalytically convert at least a portion of these components present in the engine exhaust gases. Thus, at least one catalytic converter, i.e., reaction zone, containing an oxidation and/or reduction catalyst is placed in the exhaust system of an internal combustion engine. The catalyst often comprises an inert refractory metal oxide support and a catalytically active metal on the support. A fluid comprising engine exhaust gases flows in contact with this catalyst and at least a portion of the carbon monoxide and hydrocarbon contained in the fluid is oxidized and/or at least a portion of the nitrogen oxides is reduced thus eliminating a substantial source of air pollution. Additional oxygen, from, for example, air, may be included in the fluid being contacted with the catalyst to improve reaction efficiency.

Included among the factors to be considered using catalysts of this type is physical stability. In many instances, for example, with internal combustion engines associated with transportation vehicles, the engine is often operated for relatively short periods of time followed by periods of shutdown. Thus, the catalyst temperature varys from, for example, about 1200° F. to about 1500° F. or more during engine operation and ambient temperatures, e.g., about 70° F. or less, during engine shutdown. These severe and repeated catalyst temperature variations may result in the physical weakening and even destruction of the catalyst. The repeated expansions and contractions of the catalyst caused by the temperature variations may result in the break-up of the catalyst and/or reduced catalytic effectiveness due to inefficient fluid-catalyst contacting. Also, in a related problem, the high temperatures which must be endured by the catalyst may cause a phase transition in part of the catalyst support material, thus weakening the catalyst. Further, the severe temperature environment along with the flow of hot fluids, e.g., engine exhaust gases, over the catalyst may result in metal loss, e.g., by diffusion of the catalyst metal from the support. In certain instances, the metal may migrate into the interior of the support and, as a result, the catalyst becomes less able, i.e., active, to promote the desired oxidation and/or reduction reactions. To summarize, it would be advantageous to provide catalysts having improved physical stability and catalytic activity in promoting the conversion of carbon monoxide, hydrocarbon and nitrogen oxides in the exhaust gases of internal combustion engines.

Therefore, one of the objects of the present invention is to provide an improved method for reducing the amounts of hydrocarbon and carbon monoxide emitted to the atmosphere from inernal combustion engines.

An additional object of the present invention is to provide an improved method for reducing the amount of nitrogen oxides emitted to the atmosphere from internal combustion engines.

Another object of the present invention is to provide an improved catalyst for the oxidation of hydrocarbon and carbon monoxide contained in exhaust gases from internal combustion engines.

A still further object of the present invention is to provide an improved catalyst for the chemical reduction of nitrogen oxides contained in exhaust gases from internal combustion engines.

An additional object of the present invention is to provide an improved method for producing catalysts for the chemical conversion of carbon monoxide hydrocarbon and/or nitrogen oxides contained in exhaust gases from internal combustion engines. Other objects and advantages of the present invention will become apparent hereinafter.

An improved process for reducing the amounts of hydrocarbon and carbon monoxide emitted to the atmosphere from the exhaust gases of an internal combustion engine has now been discovered. The process comprises contacting the exhaust gases with an oxidation catalyst under conditions to oxidize at least a portion of the hydrocarbon and carbon monoxide contained in the gases. The improved oxidation catalyst useful in the process of the present invention comprises a major amount of magnesium aluminate spinel and a minor amount of at least one metal component. The metal component comprises a metal which is less basic than is magnesium and is present in the catalyst in an amount sufficient to promote the oxidation of at least a portion of the hydrocarbon and carbon monoxide contained in internal combustion engine exhaust gases.

In an additional aspect, the present invention involves an improved process for reducing the amount of nitrogen oxides emitted to the atmosphere from the exhaust gases of an internal combustion engine. Thus, this process comprises contacting the exhaust gases with a catalyst under conditions to chemically reduce at least a portion of the nitrogen oxides contained in the exhaust gases. The improved catalyst comprises a major amount of magnesium aluminate spinel and a minor amount of at least one metal component comprising a metal which is less basic than is magnesium and is present in the catalyst in an amount sufficient to promote the chemical reduction of at least a portion of the nitrogen oxides contained in internal combustion engine exhaust gases.

Typical examples of the metals which are suitable for incorporation in the catalysts of the present invention include metals selected from the group consisting of Group IB metals, Group IV metals, Group V metals, Group VI metals, Group VII metals, Group VIII metals and mixtures thereof. Among the preferred catalyst metals are included titanium, vanadium, chromium, manganese, iron, cobalt, nickel, copper, silver, the platinum group metals, molybdenum, and mixtures thereof. The more preferred metals for use in the catalysts of the present invention are the platinum group metals and mixtures thereof, in particular, platinum and mixtures of platinum and palladium.

Thus, in another aspect, the present invention involves a composition of matter comprising a major amount of magnesium aluminate spinel and a minor amount of at least one platinum group metal, preferably platinum and mixtures of platinum and palladium, component. The platinum group metal component is present in the composition in an amount sufficient to promote at least one of the following: (1) the oxidation of carbon monoxide and hydrocarbon contained in the exhaust gases from internal combustion engines and (2) the chemical reduction of nitrogen oxides contained in the exhaust gases from internal combustion engines.

The catalysts of the present invention may also include a minor amount of at least one refractory metal oxide to promote the efficiency of the catalyst. Among the useful metal oxides are alumina, beryllia, boria, zirconia, magnesia, thoria, silica, and the like. Combinations or mixtures of more than one refractory metal oxide such as boria-alumina, silica alumina and the like, may be used. If a refractory metal oxide is used, it is preferred to use alumina, particularly alumina derived from boehmite hydrous alumina. In many instances, these refractory metal oxides are activated, e.g., calcined, to obtain optimum results. One method by which these refractory metal oxides may be used to produce the present catalysts is described in detail hereinafter.

The magnesium aluminate spinel suitable for use in the present invention can be prepared, for example, according to the method disclosed in U.S. Pat. No. 2,992,191. The spinel can be formed by reacting, in an aqueous medium, a water-soluble magnesium inorganic salt and a water-soluble aluminum salt in which the aluminum is present in the anion. Suitable salts are exemplified by the strongly acidic magnesium salts such as the chloride, nitrate or sulfate and the water-soluble alkali metal aluminates. The magnesium and aluminate salts are dissolved in an aqueous medium and a spinel precursor is precipitated through neutralization of the aluminate by the acidic magnesium salt. Excesses of acid salt or aluminate are preferably not employed, thus avoiding the precipitation of excess magnesia or alumina. preferably, the precipitation is washed free of extraneous ions before being further processed.

The precipitate can be dried and calcined to yield the magnesium aluminate spinel. Drying and calcination may take place simultaneously. However, it is preferred that the drying take place at a temperature below which water of hydration is removed from the spinel precursor. Thus, this drying may occur at temperatures below about 500° F., preferably from about 220° F. to about 450° F. Suitable calcination temperatures are exemplified by temperature ranging from about 800° F. to about 2000° F. or more. Calcination of the spinel precursor may take place in a period of time of at least about ½ hour and preferably in a period of time ranging from about 1 hour to about 10 hours.

The catalysts of the present invention may be used in any form which is compatible with the catalytic converter, i.e., hydrocarbon and carbon monoxide oxidation reaction zone and/or nitrogen oxide reduction reaction zone of the engine exhaust gas system. For example, the magnesium aluminate spinel produced as described above may be formed into macrosize particles, e.g., granules, spheres, tablets, extrudates and the like, as well as into a solid unitary body, comprising a major amount of magnesium aluminate spinel. Although these particles and body may contain minor amounts of other materials, e.g., at least one refractory metal oxide, it is preferred that they be at least about 85% by weight of magnesium aluminate spinel and more preferably, substantially pure magnesium aluminate spinel. By the phrase "solid unitary body" as used herein is meant a body made of a single piece of solid material.

The magnesium aluminate spinel useful in the present invention can be formed, i.e., macroformed, into macrosize particles using, for example, conventional extrusion or tabletting techniques. This macroforming can be performed by first preparing a mixture of the dried spinel precursor and water. This mixture can then be processed using conventional techniques to form the desired macrosize particles. The proportions of spinel precursor and water used in this mixture is not critical to the present invention and will vary depending, for example, on the forming techniques used. It is customary, especially in the case of tabletting, to incorporate in the spinel precursor-water mixture minor amounts of a die lubricant which is either non-deleterious to the final macrosize particles or which can be removed by the subsequent calcining step. Often employed, for example, are organic compounds, e.g., polyethylene, which, by calcining the formed particles in an oxidizing atmosphere, can be subsequently burned away.

When macroforming by extrusion, sufficient water should be present in the spinel precursor-water mixture to provide a workable dough. This can be accomplished, for example, by terminating the drying of the spinel precursor once the free water content of the "dried" product has reached about 20 to about 60, preferably from above 20 to about 40, percent by weight. However, it may be preferred to first dry the spinel precursor to obtain a product which is low enough in water content to enable the product to be readily comminuted, then grind the product to a small particle size, add back water to achieve a dough like consistency and then extrude the mixture into macrosize particles. In any event, the macrosized particles, e.g., tablets, extrudates, and the like, thus formed are calcined to obtain particles of the magnesium aluminate spinel useful in the present invention. Calcination of these particles may be carried out, for example, at temperatures ranging from about 800° F. to about 2000° F. or more and for a period of time of at least one-half hour and preferably for a period of time ranging from about 1 hour 10 hours. Although the spinel particles may have some catalytic activity, it is preferred that the calcination conditions be adjusted to render the calcined particles substantially inert, i.e., substantially devoid of the desired oxidation and/or reduction catalytic activity of the catalysts of the present invention. Therefore, it is preferred to calcine these particles at relatively severe conditions, e.g., at a temperature in the range from about 2000° F. to about 2000° F., more preferably from about 1200° F. to about 1500° F.

The size of the magnesium aluminate spinel particles formed by the above described macroforming procedures is not critical to the present invention and may vary over wide range, for example, a minimum dimension of at least about 0.01 inch and a maximum dimension up to about one-fourth inch or more can be utilized. In any event, the size of the spinel particles should be such as to be compatible with the fluid dynamics e.g., mass flow rates, mass velocity and the like, which exist in the reaction zone wherein the particles are to be placed.

If desired, the magnesium aluminate spinel useful in the present invention may be formed into a solid unitary body using convention techniques. For example, the spinel precursor can be dried and calcined as described above to form the spinel. This spinel can be comminuted, e.g., ground, into fine particles, for example, having an average diameter of less than about 500 microns, preferably less than about 200 microns.

A liquid suspension comprising these magnesium aluminate spinel fine particles along with at least one binder and, if necessary, a binder solvent present in an amount sufficient to maintain at least a major portion, preferably at least about 90%, of the binder in the liquid phase, is applied to a carrier material which can be formed in the desired shape of the final solid unitary body to produce a coated carrier. In many instances, the binder material used is normally a solid, and thus, a binder solvent is included in the suspension. Any solvent capable of solubilizing the binder material without having a deleterious effect on the final unitary solid body may be used in the suspension. The amount of solvent used is not critical provided that it performs its' function. For example, the solvent may comprise from about 20% to about 90% or more of the total suspension, The purpose of the binder is to bond the unfired spinel particles to the carrier, to impart strength to the coated carrier which aids in forming the coated carrier to the desired shape and to retain the formed, unfired coated carrier in the desired shape after forming and prior to firing. The ratio of binder to spinel in the liquid suspension is not critical to the present invention and will vary, for example, based on the binder and carrier used as well as the desired shape of the final unitary body. Typically, the binder will be present in an amount from about 5% to about 70% or more, preferably from about 10% to about 50% by weight of the total binder-spinel in the suspension.

Organic binders are preferred for use since they are removed by decomposition and volatilization when the formed article is fired to sinter the spinel. Typical binders include natural materials like gum arabic, colophony and shellac, and synthetic organic resins like acrylate resins, methacrylate resins, alkyd resins, cellulose derivatives, coumaronindene resins, epoxy resins, furan resins, polyisobutylene, isocyanate resins, phenolic resins, polyamides, polyesters, resorcinol resins, styrene resins, terpene resins, urea resins, vinyl resins, chlorinated paraffins, melamine resins and the like. Furthermore, heat-curable organic binders are preferred over those which are hardened exclusively by solvent evaporation as it is easier to control curing temperature and time than the time-temperature relationship for solvent removal. The time-temperature relationship for heat-curable binders varies with each of the operable binders, but are well-known quantities for each, such information being published in magazines, journals, and brochures of the trade. The time-temperature relationships for the evaporation of solvents can be readily determined by experiment.

The purpose of the carrier is to provide support for the unfired coating to allow it to be formed to the desired shape prior to sintering, i.e., firing, the spinel coating. Organic carriers which are substantially decomposed upon firing the formed article are preferred for use. Typical organic carriers include cellulose acetate paper, onion skin paper, tea bag paper, nylon cloth, rayon cloth, polyethylene film and the like.

The suspension comprising binder and spinel fine particles may be applied to the carrier by any conventional means such as spraying, dipping or brushing the liquid mixture onto the carrier to obtain the coated carrier. Alternately, the binder (and binder solvent, if necessary) and the spinel fine particles may be applied to the carrier material separately to obtain the coated carrier.

The forming of the coated carrier to the desired shape is accomplished by shaping, e.g., corrugating, the coated carrier prior to firing the spinel. Alternately, the carrier may, in certain instances, be shaped prior to being coated. In any event, the shaped, coated carrier is heated in an oxidizing atmosphere to a temperature in the range from about 1700° C. to about 2000° C. or more for a period of time sufficient to fire the spinel and, preferably, decompose the binder and carrier materials, and thus form the final unitary solid body. Typical firing times range from at least about one-half hour to about 10 hours and preferably from about 1 hour to about 4 hours. The final solid unitary body produced as above is substantially inert.

The firing of the spinel is accomplished in the normal manner by placing the shaped, coated carrier in a furnance and heating it at a rate slow enough to prevent breakage due to theremal shock to a temperature high enough to cause the spinel particles to sinter. While the heating rates are dependent upon the shape of the coated carrier, this condition is not critical and can be readily determined by one skilled in the art of firing of ceramic articles.

An improved method, e.g., one not requiring an extraneous binder material, has now been discovered by which a solid unitary body comprising a major amount of crystalline magnesium aluminate spinel can be formed. This method comprises:

1. contacting in an aqueous medium a soluble inorganic magnesium salt and a soluble salt having aluminum in the anion to precipitate a first sipinel precursor:
2. calcining said first spinel precursor preferably at a temperature in the range from about 800° F. to about 2000° F., to form a first magnesium aluminate spinel;
3. contacting in an aqueous medium a soluble inorganic magnesium salt and a soluble salt having aluminum in the anion to precipitate a second spinel precursor;
4. forming an aqueous suspension comprising said first magnesium aluminate spinel and said second spinel precursor wherein the weight ratio of said spinel to said spinel precursor is from about 99:1 to about 4:1 and the amount of water in said suspension is such as to allow said suspension to be applied to a carrier material, hereinafter described, as a film of desired uniformity and thickness;

5. treating a carrier material with said suspension to form a coated carrier including a film on said carrier material of desired uniformity and thickness, said carrier material being capable of being formed into the shape of said solid unitary body and being substantially decomposible in an oxidizing atmosphere at a temperature in the range from about 800° F. to about 2000° F.; and 6. treating said coated carrier in an oxidizing atmosphere at a temperature and for a time sufficient to calcine said second spinel precursor, substantially decompose said carrier material and form said solid unitary body.

Thus, spinel prepared as described previously is dried, calcined, and preferably comminuted into fine particles, for example, having an average diameter of less than about 500 microns, more preferably less than about 200 microns. An aqueous suspension comprising this calcined spinel and additional spinel precursor is formed. Of course, the first and second spinel precursors noted above can be prepared together and then divided, with a portion being further processed, e.g., calcined, before forming the aqueous suspension. No additional binder material is required in the suspension. The weight ratio of spinel to spinel precursor in this suspension is not critical and may range from about 99:1 to about 4:1, preferably from about 20:1 to about 6:1. The amount of water in the suspension is such as to allow the suspension to be applied onto the carrier material as a film of the desired uniformity and thickness. Typically, the water, including water of hydration, amounts to from about 50% to about 99%, preferably from about 60% to about 95% and more preferably from about 75% to about 90%, by weight of the total suspension.

This aqueous suspension may be applied to a carrier material, such as those noted previously, by any conventional means described previously to obtain a coated carrier. Alternately, the spinel precursor (and water) and the spinel fine particles can be applied to the carrier material separately to obtain a coated carrier.

The shaping of this spinel-spinel precursor coated carrier may be accomplished as described previously. Again, the carrier may be shaped before being coated. The shaped, coated carrier may be heated in an oxidizing atmosphere to a temperature in the range from about 3100° F. to about 3900° F. or more for a period of time sufficient to fire the spinel. However, it has been found that treatment at these high temperatures is not required to obtain the final solid unitary body from the spinel-spinel precursor coated carrier. Thus, the spinel-spinel precursor coated carrier can be treated in an oxidizing atmosphere at a temperature ranging from about 800° F. to about 2000° F. or more for a period of time, for example, at least about one-half hour, preferably from about 1 hour to about 10 hours, sufficient to calcine the spinel precursor, substantially decompose the carrier material and form the final solid unitary body. In order to produce a substantially inert final solid unitary body it is preferred that the coated carrier be treated at a temperature from about 1000° F. to about 2000° F., more preferably from about 1200° F. to about 2000° F.

The spinel support, either as the macrosize particles or the solid unitary body may be impregnated with at least one catalytic material. If metals from groups IB, IV, V, VI and VII are used and non-platinum group metal Group VIII, it is preferred that the final catalysts contain from about 0.01% to about 10%, more preferably from about 0.05% to about 5%, by weight of the metal, calculated on an elemental basis. If platinum group metals are used, it is preferred that the final catalyst contain from about 0.01% to about 3%, more preferably from about 0.01% about 1.0%, by weight of the metal, calculated on an elemental basis. In any event, the metal component or mixture of metal components is present in the final catalyst in an amount sufficient to promote the oxidation of at least a portion of the hydrocarbon and carbon monoxide contained in internal combustion engine exhaust gases and/or the chemical reduction of the nitrogen oxides contained in internal combustion engine exhaust gases.

The impregnation of the spinel support with the metal components can be carried out in any one of many conventional ways well known to the art. Thus, for example, the spinel support can be contacted with an aqueous solution of at least one water soluble compond of the selected catalytically active metal component to absorb part or all of the solution in the spinal support. After allowing the desired amount of absorption to take place, the spinel support is dried and calcined, preferably in an oxidizing atmosphere, as described previously to yield the final catalyst. Alternately, the metal component can be precipitqted on the spinel support by contacting the spinel support with an aqueous solution of at least one water-soluble acid salt of the desired metal component which is then neutralized. The spinel support containing the precipitated metal component is dried and calcined as previously described to yield the final catalyst.

An additional method for adding the catalytically active metal component to the spinel support has now been found. This method, although applicable to macro-size spinel particles, is particularly advantageous when employed with unitary solid bodies of spinel. This additional method comprises forming an aqueous slurry containing spinel precursor and at least one compound of the desired metal component; contacting this aqueous slurry with the spinel support to form a metal component-containing film on the spinel support; and calcining, preferably in an oxidizing atmosphere, the spinel support to yield the final catalyst. Although spinel precursor is preferred, at least a portion of the spinel precursor in this slurry can be replaced by at least one refractory metal oxide such as those noted hereinabove, particularly boehmite alumina. Preferably, the calcination takes place at a temperature in the range from about 800° F. to about 2000° F. for a time in the range from about one-half hour to about 10 hours. The calcination preferably occurs in an oxidizing atmosphere. The metal-containing compounds used may be water-soluble, water-insoluble or mixtures of both.

The aqueous slurry comprising spinel precursor (and/or refractory metal oxides) and at least one metal component can vary widely in composition depending, for example, on the metal component being used, the composition desired for the final catalyst and the like. To illustrate, the ratio of spinel precursor to catalytically active metal component (calculated on an elemental basis) may range from about 1000:1 to about 1:1 or less, preferably from about 100:1 to about 3:1. The amount of water may vary depending, for example, on the thickness of the film desired to be placed on the spinel support. Typically, the water may comprise from about 50% to about 99%, preferably from about 75% to about 99%, by weight of the slurry.

The coated spinel carrier may be dried and calcined, as described previously, to yield the final catalyst.

The final calcination temperature may be chosen so as to determine the physical character of the final catalyst. As the calcination conditions increase in severity, e.g., increase in temperature, the surface area of the spinel and/or refractory metal oxide will decrease. Thus, as is most often the case, catalyst used for oxidizing the carbon monoxide and hydrocarbon in exhaust gases have lower surface areas than do catalysts used to chemically reduce the nitrogen oxides in the exhaust gases. Therefore, the final calcination temperature may be chosen depending upon the proposed utility of the final catalyst. For example, when a high surface area is required, calcination temperatures from about 800° F. to 1400° F. may be used and are preferred. On the other hand, when a final catalyst having reduced surface area is desired, final calcination temperatures in the range from about 1000° F. to about 2000° F. or more may be chosen and are preferred. In any event, the calcination to produce the final catalyst is preferably carried out in an oxidizing atmosphere, e.g., air, to provide an optimum catalyst.

For the reduction of nitrogen oxides, the exhaust gases of internal combustion engines are preferably contacted with the catalyst of the present invention at temperatures in excess of about 800° F. preferably in excess of about 1200° F., in the presence of only small amounts of free oxygen. In this connection, most engine operation is normally under rich-mixture condition because rich-mixture oparation is essential for smooth performance of the engine at idle and light load, for high power output at full load, and is also frequently necessary for the suppression of knock in the combustion process. Thus, the exhaust gases coming from the combustion chamber of an internal combustion engine will normally contain only very small amounts of free oxygen, which amounts of oxygen will normally be less than about 2% on a volume basis, e.g., 0.8% by volume of oxygen. In accordance with the invention, therefore, the exhaust gases of an internal combustion engine are contacted without adding external oxygen or air to the exhaust stream with a catalyst of the invention to reduce at least a portion of the nitrogen oxides contained therein.

If there is no addition of air or oxygen outside of the engine combustion chamber, i.e., in the exhaust stream, the reduction of the nitrogen oxides in the exhaust gas will be promoted by the catalyst with little oxidation of the unburned hydrocarbons contained therein. After this nitrogen oxide reduction, it may be desirable to contact the exhaust gases, in the presence of a controlled amount of additional air with an oxidation catalyst, preferably, the oxidation catalyst of the present invention, to oxidize at least a portion of the carbon monoxide and hydrocarbons contained therein.

In a preferred embodiment of the invention, the exhaust gases having at least a portion of the nitrogen oxides reduced is then contacted with an oxidation catalyst of the present invention at temperatures in excess of about 800° F., preferably in excess of about 1200° F., in the presence of oxygen or air which may be added to the exhaust gas stream in an amount sufficient to catalytically oxidize the carbon monoxide and unburned hydrocarbons contained therein. The presence of an amount of oxygen within the range from about 0.5% to about 10%, preferably from about 2% to about 10% by volume of higher, based on the total gases contacted by the oxidation catalyst, will in most instances be sufficient to effect substantial oxidation of the unburned hydrocarbons and carbon monoxide contained in the exhaust gases. In any event, temperatures in excess of about 800° F., more preferably in excess of about 1200° F., are preferred when exhaust gases are contacted with the oxidation catalyst of the present invention to oxidize at least a portion of the carbon monoxide and hydrocarbon contained therein.

The invention having been described in detail, the following examples are provided to shown specific embodiments of the compositions thereof. it will be understood the examples are given for illustration purposes only and not by way of limitation.

EXAMPLE I

The magnesium aluminate spinel precursor useful in the present invention can be prepared as follows:

In sufficient $H_2O$ to form 4 liters of solution were dissolved 80 grams of sodium hydroxide and 1095 grams of Nalcat sodium aluminate (800 grams $NaAlO_2$). To this solution was added 500 milliliters of Filter-Cel (a diatomaceous earth filter aid) and the resulting material was filtered. To 8 liters of water were added over a one-half hour period 3290 milliliters of the filtrate and 3290 milliliters of a solution containing 841 grams $Mg(NO_3)_2.6H_2O$ and 180 milliliters of concentrated nitric acid to give a precipitate. The resulting solution was adjusted to a pH of 8.0 by the addition of a few drops of nitric acid. The resulting material was filtered and the solids were washed six times with water and dried for 24 hours at 230° F. The washed and dried product was further washed until substantially free of sodium and nitrate ions. The thus formed magnesium alumina spinel precursor was dried for 24 hours at 230° F.

EXAMPLE II

This example illustrates the manufacture of the improved catalysts of the present invention.

The spinel precursor as prepared in Example I is ground into fine particles and is mixed with water so as to form a mixture comprising about 30% by weight free water. This mixture is blended into a uniform dough like consistency. The mixture is then extruded into macrosized particles. These particles are then subjected to calcination at a temperature of about 1000° F. for a period of time of about 8 hours. Upon calcination, the extrudates in the form of cylinders having diameters of about 0.1 inch and a length of about one-eighth inch are ready to be impregnated with catalytically active metals.

The macrosized spinel particles are impregnated with cobalt and molybdenum by contacting the particles with an aqueous solution containing ammonium hydroxide, $Co(NO_3)_2.6H_2O$ and $(NH_4)_6Mo_7O_{24}.4H_2O$. The macrosized particles are left in contact with this aqueous solution for about 10 hours. The impregnated particles are dried at 230° F. and are then calcined for about 6 hours at 1200° F. The resulting calcined impregnated particles are useful as a catalyst to promote the oxidation of carbon monoxide and hydrocarbon and the reduction of nitrogen oxides contained in exhaust gases from internal combustion engines.

EXAMPLE III

This example illustrates the manufacture of the catalyst of the present invention in the form of a solid unitary body.

A portion of the spinel precursor prepared as in Example I is calcined for about 6 hours at 1200° F. to form spinel which is then ground into fine particles having an average diameter of less than about 200 microns. These spinel fine particles are combined with additional spinel precursor in a weight ratio of 9:1 and water to form an aqueous suspension which comprises about 90% by weight of water. This aqueous suspension is used to coat a conventional carrier, i.e., an organic material in the shape of the final solid unitary body and substantially decomposible in an oxidizing atmosphere at a temperature in the range from about 800° F. to 1300° F. The coated carrier is dried at about 230° F. for about 10 hours and then is treated in contact with air for about 6 hours at 1000° F. to calcine the spinel precursor, substantially decompose the carrier and form a solid unitary body consisting essentially of magnesium aluminate spinel.

A mixture of spinel precursor, prepared as in Example I, and chloroplatinic acid in a weight ratio of about 10:1 is formed in water so that the water comprises about 95% of the total mixture. The solid unitary body noted above is contacted with the mixture to form a coated solid unitary body which is dried at about 230° F. and then calcined for about 6 hours at about 900° F. to form a catalyst of the present invention.

EXAMPLE IV

This example illustrates the use of the catalysts prepared as in Example II to promote the oxidation of carbon monoxide and hydrocarbons present in the exhaust gases from internal combustion engines.

Two automobiles equipped with standard 4 cylinder internal combustion engines are selected for testing. Each of these automobiles are equipped with a catalytic converter in which the catalyst prepared as in Example II is placed. These catalytic converters are in fluid communication with the exhaust system of the internal combustion engine. Therefore, exhaust gases pass through the catalytic converter while being passed from the engine to the ambient atmosphere. Additional oxygen from the atmosphere is combined with the exhaust gas prior to the catalytic converter containing the oxidation catalyst in an amount to effect the oxidation of at least a portion of the carbon monoxide and hydrocarbons present in the exhaust gases. Over a period of time, the catalyst of the present invention promotes the oxidation of the carbon monoxide and hydrocarbon contained in the exhaust gases from the internal combustion engines of both of the automobiles.

EXAMPLE V

This example illustrates the use of the catalyst prepared as in Example III to promote the reduction of nitrogen oxides present in the exhaust gases from internal combustion engines. Two automobiles equipped with standard 4 cycle internal combustion engines are selected for testing. Each of these engines are equipped with a catalytic converter in which the catalyst prepared as in Example III is placed. These catalytic converters are in fluid communication with the exhaust system of the internal combustion engine. Therefore, exhaust gases pass through the catalytic converter while being passed from the engine to the ambient atmosphere. Over a period of time, the catalysts of the present invention promote the reduction of the nitrogen oxides contained in the exhaust gases from the internal combustion engine of both of the automobiles.

The catalyst of Example II can be used to reduce nitrogen oxides and the catalyst of Example III can be used to promote the oxidation of hydrocarbon and carbon monoxide. In order to get optimum benefits, however, it may be advisable to control the surface area of the catalyst, as described previously, depending on the particular utility involved.

In any event, it can be seen that the present invention provides improved hydrocarbon and carbon monoxide oxidation catalysts and nitrogen oxide reduction catalysts for reducing the amounts of harmful components in internal combustion engine exhaust gases as well as improved methods for using and making same. Not only are these present compositions effective catalysts, but they also have outstanding physical properties, e.g., temperature stability, strength and the like, which are highly beneficial in catalysts used to treat exhaust gases from internal combustion engines.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for producing a supported metal-containing catalyst comprising a first magnesium alumina spinel support, and disposed as a coating on said first magnesium aluminate spinel support, a mixture comprising second magnesium aluminate spinel and at least one catalytically active metal component sufficient to promote at least one of the following: (a) the oxidation of at least a portion of the hydrocarbon and carbon monoxide contained in the exhaust gases of an internal combustion engine and (b) the chemical reduction of at least a portion of the nitrogen oxides contained in the exhaust gases of an internal combustion engine, said metal being less basic than magnesium, which comprises:

1. forming an aqueous slurry comprising magnesium aluminate spinel precursor, and at least one compound of said metal, said precursor being derived from contacting in an aqueous medium a soluble inorganic magnesium salt and a soluble salt having aluminum in the anion to precipitate a first spinel precursor, the amount of water in said slurry being such as to allow said slurry to be applied to said support as a film of desired uniformity and thickness;
   2. contacting said support with said aqueous slurry to form a coated support including a metal-containing film of desired thickness and uniformity on said support; and
   3. treating said coated support at a temperature and for a time sufficient to calcine said material and form said supported metal-containing catalyst.

2. The method of claim 1 wherein said metal is selected from the group consisting of Group IB metal, Group IV metal, Group V metal, Group VI metal, Group VII metal, Group VIII metal and mixtures thereof.

3. The method of claim 2 wherein the ratio of said spinel precursor to said metal compound in said aqueous slurry is in the range from about 1000:1 to about 1:1 and the amount of water in said aqueous slurry ranges from about 50% to about 99% by weight of the total slurry.

4. The method of claim 3 wherein step (3) is carried out at a temperature in the range from about 800° F. to about 2000° F. for a time from about one-half hour to about 10 hours.

5. The method of claim 4 wherein said metal is selected from the group consisting of Group IB metal, Group IV metal, Group V metal, Group VI metal, Group VII metal, Group VIII metal and mixtures thereof.

6. The method of claim 3 wherein said metal is selected from the group consisting of platinum group metal and mixtures thereof.

7. The method of claim 6 wherein said metal is selected from the group consisting of platinum and mixtures of platinum and palladium.

* * * * *